United States Patent
Nishikawa

Patent Number: 5,353,274
Date of Patent: Oct. 4, 1994

[54] BEAM DIAMETER EXPANSION OF A MULTI-BEAM OPTICAL INFORMATION SYSTEM

[75] Inventor: Koichiro Nishikawa, Inagi, Japan

[73] Assignee: Canon Kabushiki Kaisha, Tokyo, Japan

[21] Appl. No.: 961,824

[22] Filed: Oct. 16, 1992

[30] Foreign Application Priority Data

Oct. 22, 1991 [JP] Japan ................................. 3-301241

[51] Int. Cl.$^5$ ............................................. G11B 7/00
[52] U.S. Cl. ................................... 369/121; 369/112; 369/110; 369/13; 369/44.11; 360/114
[58] Field of Search ............... 369/112, 44.37, 44.38, 369/44.11, 44.24, 120, 122, 110, 13; 360/114

[56] References Cited

U.S. PATENT DOCUMENTS

| | | | |
|---|---|---|---|
| 4,517,667 | 5/1985 | Sprague | 369/122 |
| 4,520,472 | 5/1985 | Reno | 369/112 |
| 4,766,582 | 8/1988 | Ando | 369/112 |
| 4,901,325 | 2/1990 | Kato et al. | 372/44 |
| 4,951,274 | 8/1990 | Iwanaga et al. | 369/112 |
| 5,018,127 | 5/1991 | Ando | 369/112 |
| 5,023,860 | 6/1991 | Ueda | 369/112 |
| 5,073,888 | 12/1991 | Takahashi | 369/112 |
| 5,105,410 | 4/1992 | Maeda et al. | 369/44.37 |

FOREIGN PATENT DOCUMENTS

| | | |
|---|---|---|
| 0097035 | 12/1983 | European Pat. Off. . |
| 0216704 | 4/1987 | European Pat. Off. . |
| 0388760 | 9/1990 | European Pat. Off. . |
| 58-220247 | 12/1983 | Japan . |
| 64-70936 | 3/1989 | Japan . |
| 01251330 | 10/1989 | Japan . |

Primary Examiner—Paul M. Dzierzynski
Assistant Examiner—Kim-Kwok Chu
Attorney, Agent, or Firm—Fitzpatrick, Cella, Harper & Scinto

[57] ABSTRACT

A plural-beam optical head is constituted by a monolithic semiconductor laser array having a plurality of light emitting points, a collimator lens for collimating laser beams emitted from the plurality of light emitting points, an objective lens for imaging the laser beams on an optical information recording medium, and a device for expanding the diameters of the laser beams in the direction of arrangement of the plurality of light emitting points. In the plural optical head, the following condition is satisfied:

$$(d \cdot f_0)/(f_{col} \cdot m) < 20 \text{ [}\mu\text{m]},$$

where d is the maximum spacing between adjacent ones of the plurality of light emitting points, $f_{col}$ is the focal length of the collimator lens, $f_0$ is the focal length of the objective lens, and m is the expansion magnification of the device for expanding the diameters of the laser beams.

6 Claims, 4 Drawing Sheets

BEAM DIAMETER EXPANSION OF A MULTI-BEAM OPTICAL INFORMATION SYSTEM

BACKGROUND OF THE INVENTION

1. Field of the Invention

This invention relates to an optical head for use in an optical information recording-reproducing apparatus such as a magneto-optical disk apparatus, and particularly to an optical head using a light source having a plurality of light emitting points. The optical head of the present invention can be applied, as an optical head for effecting at least two of the functions of erasing, recording and reproduction of information at a time.

2. Related Background Art

In the field of optical information recording and reproduction, there have heretofore been proposed optical heads capable of effecting erasing and recording or recording and reproduction at a time by the use of a plurality of beams. As one of such proposals, mention may be made of the technique described in Japanese Laid-Open Patent Application No. 58-220247. The outward optical system of it is such as shown in the block diagram of FIG. 1 of the accompanying drawings. In FIG. 1, two laser beams emitted from a monolithic semiconductor laser array 5 having two light emitting points are imaged as light spots for recording and reproduction on a magneto-optical disk 12 which is an optical information recording medium through a collimator lens 8, a beam splitter 23 and an objective lens 11, and recording and reproduction can be accomplished at the same time by these two spots.

In the monolithic semiconductor laser array as used in the above-described prior-art optical head, the spacing between the light emitting points thereof is generally of the order of 100 $\mu$m or more in order to avoid thermal interference and electrical interference between the light emitting points. In the optical head of the construction as shown in FIG. 1, the spacing L between the spots on the magneto-optical disk 12 is $$L = d \cdot (f_0/f_{col}),$$

where d is the spacing between the light emitting points, $f_{col}$ is the focal length of the collimator lens and $f_0$ is the focal length of the objective lens 11. Usually, in an optical head capable of recording and erasing, the numerical aperture of the collimator lens is 0.2 or greater and the numerical aperture of the objective lens is of the order of 0.52–0.55 in order to effectively utilize the light from a semiconductor laser, and when the effective diameter of these lenses is of the order of 4 mm$\phi$, $f_{col}$ $\leq$ 10 mm for $f_0$ = 3.8–4 mm. Accordingly, from the above equation, the spacing L between the spots is 38 $\mu$m or greater.

Now, information tracks on the magneto-optical disk create eccentricity by the rotation of the disk. The amount of eccentricity of the tracks is usually 100 $\mu$m at greatest. Therefore, in the optical head as described above, relative track deviation occurs between the two spots. This will now be described with reference to FIG. 2 of the accompanying drawings. The reference numeral 1 designates a track of radius a having a point 2 as its center. Two spots 3 and 4 are spaced apart by a distance L from each other, and both of them are on the track 1. When the track becomes eccentric, for example, when the track 1 is rotated by an angle $\theta$ about the spot 3 and moves to 1', the center of the track moves to 2' and the position on the track which corresponds to the spot 4 moves to 4'. The spacing between the position 2 and the position 2' corresponds to the amount of eccentricity W, and the spacing between the position 4 and the position 4' is the amount of relative track deviation $\Delta$T. Approximately, W$\simeq$a$\cdot\theta$ and $\Delta$T $\simeq$L$\cdot\theta$ and accordingly, $\Delta$T $\simeq$L$\cdot$W/a. If for example, a=30 mm and W=100 $\mu$m, when L=38 mm, $\Delta$T$\simeq$0.13 $\mu$m and thus, in the prior-art optical head as described above, there is caused relative track deviation of 0.13 $\mu$m or more.

So, in Japanese Laid-Open Patent Application No. 1-70936, in order to make the amount of relative track deviation $\Delta$T small, it is proposed to dispose two independent semiconductor chips in opposed relationship with each other to construct a hybrid array, and shortening the spacing d between light emitting points while avoiding thermal interference and electrical interference between the light emitting points to thereby shorten the spacing L between spots. The outward optical system of it is shown in the block diagram of FIG. 3 of the accompanying drawings. Semiconductor laser chips 101 and 102 are disposed on a mount member 25 in opposed relationship with each other. Two laser beams emitted from the semiconductor laser chips 101 and 102 are collimated by a collimator lens 8, are transmitted through a half wavelength plate 24 and a beam splitter 23 along substantially the same optical path, are reflected by a mirror 10 and are stopped down as spots 3 and 4 for recording and reproduction, respectively, on a magneto-optical disk 12 by an objective lens 11. Since the light source is of an array construction comprising semiconductor laser chips opposed to each other, the laser beams emitted from the semiconductor laser chips become s-polarized lights relative to the beam splitter 23. Because of the characteristic of the beam splitter 23, s-polarized lights are inconvenient and therefore, the s-polarized lights are converted into p-polarized lights by the half wavelength plate 24. In this example of the prior art, the spacing d between the light emitting points is 27 $\mu$m, and when the above-mentioned values of the focal length of the collimator lens and the focal length of the objective lens are adopted, the spacing L between the spots is of the order of 10.3 $\mu$m, and the corresponding amount of relative track deviation $\Delta$T is 0.035 $\mu$m when eccentricity is 100 82 m.

Generally, in a magneto-optical disk, the allowable amount of track deviation is of the order of 0.1 $\mu$m. Further, in the foregoing description, it has been assumed that there is no track deviation at the position of the spot 3, but actually, at this position as well, track deviation occurs due to a servo follow-up error or the like. Accordingly, distributed to the spot 3 and the spot 4 at a square mean, the order of 0.07 $\mu$m or less is desired as the amount of relative track deviation $\Delta$T. That is, the order of 21 $\mu$m or less is desired as the spacing L between the spots.

Now, in the above-described example of the prior art using a hybrid semiconductor laser array, the spacing between the light emitting points is made small by the construction in which the laser chips are opposed to each other, thereby realizing an amount of relative track deviation $\Delta$T of 0.07 $\mu$m or less, but the construction in which the laser chips are opposed to each other requires a half wavelength plate, thus resulting in an increase in the number of parts. Further, the fact of being hybrid leads to a construction in which the positions of the two light emitting points are held by the mount member and the spacing between the light emitting points is liable to change and therefore, as compared with the case of being monolithic, there is a problem in respect of the reliability in the light source portion.

SUMMARY OF THE INVENTION

It is the object of the present invention to provide a plural-beam optical head which uses a monolithic semiconductor laser array and in which the amount of relative track deviation is 0.07 μm or less.

According to the present invention, to achieve the above object, there is provided a plural-beam optical head having a monolithic semiconductor laser array having a plurality of light emitting points, a collimator lens for collimating a plurality of laser beams emitted from said plurality of light emitting points, and an objective lens for imaging said plurality of laser beams on an optical information recording medium, characterized in that provision is made of means for expanding the diameters of said plurality of laser beams in the direction of arrangement of said light emitting points, and the following condition is satisfied:

$$(d \cdot f_0)/(f_{col} \cdot m) < 20 \ [\mu m],$$

where d is the maximum spacing between adjacent ones of said plurality of light emitting points, $f_{col}$ is the focal length of said collimator lens, $f_0$ is the focal length of said objective lens, and m is the expansion magnification of said means for expanding the diameters of said laser beams.

The plural-beam optical head of the present invention uses a monolithic semiconductor laser array and therefore can secure high reliability as compared with one using a hybrid semiconductor laser array. Also, in the present embodiment, use is made of means for expanding the diameters of the plurality of laser beams in the direction of arrangement of the light emitting points of the monolithic semiconductor laser array and therefore, by suitably setting the focal length of the collimator lens, the focal length of the objective lens and the expansion magnification of the means for expanding the diameters of the laser beams, the spacing between light spots on the optical information recording medium can be made sufficiently small even if the spacing between the light emitting points of the laser array is great and thus, there can be constructed an optical head in which the amount of track deviation by the eccentricity or the like of information tracks is sufficiently small.

DESCRIPTION OF THE PREFERRED EMBODIMENTS

An embodiment of the present invention will hereinafter be described with reference to the drawings.

Figure 1:
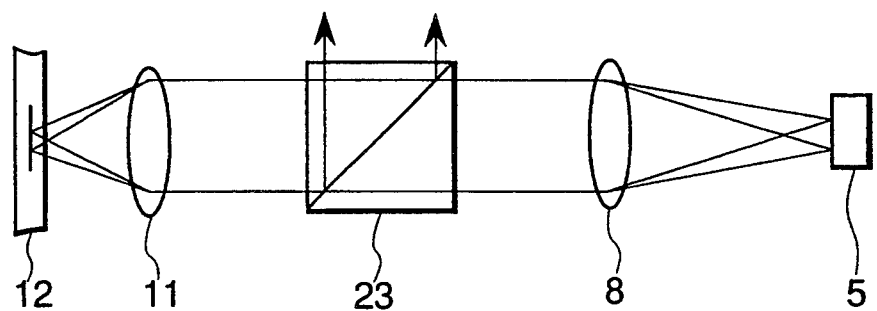
FIG. 1 is a schematic diagram showing the outward optical system of an optical head according to the prior art.
Figure 2:
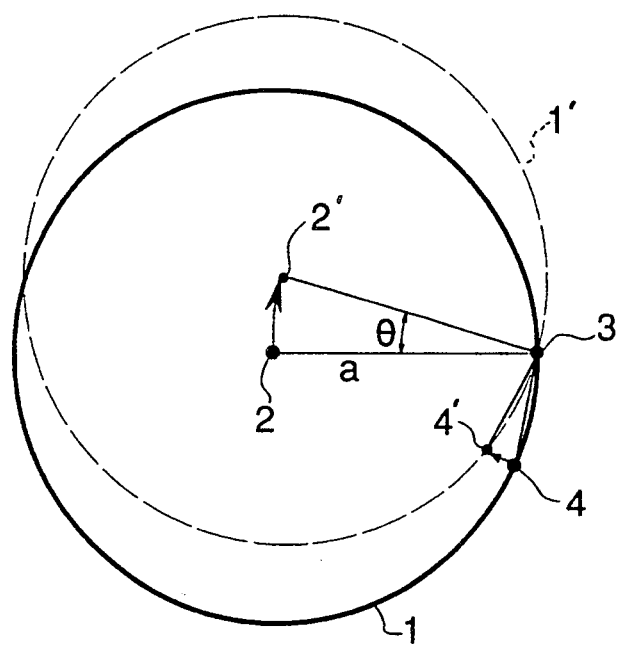
FIG. 2 illustrates the manner in which relative track deviation occurs between two spots.
Figure 3:
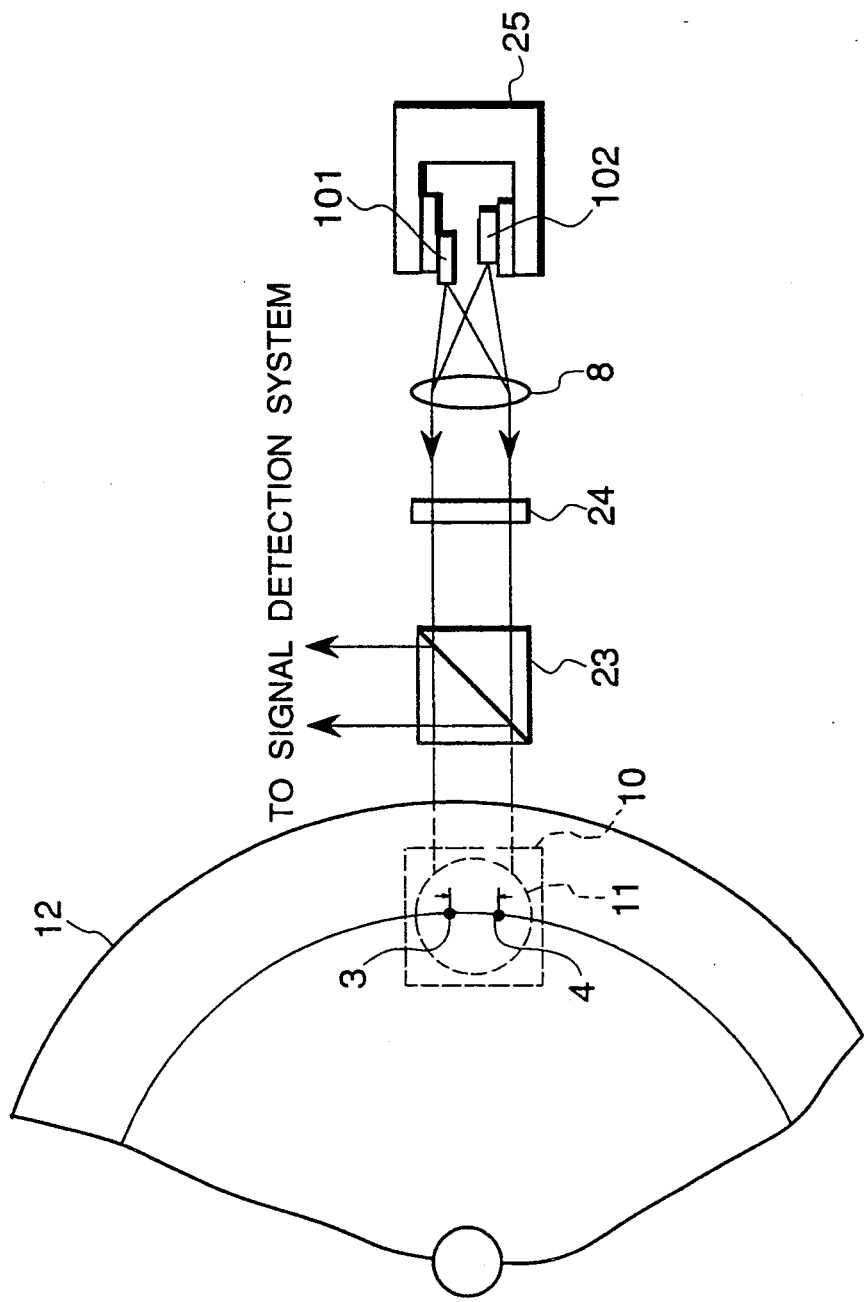
FIG. 3 is a schematic diagram showing the outward optical system of an optical head according to the prior art.
Figure 4:
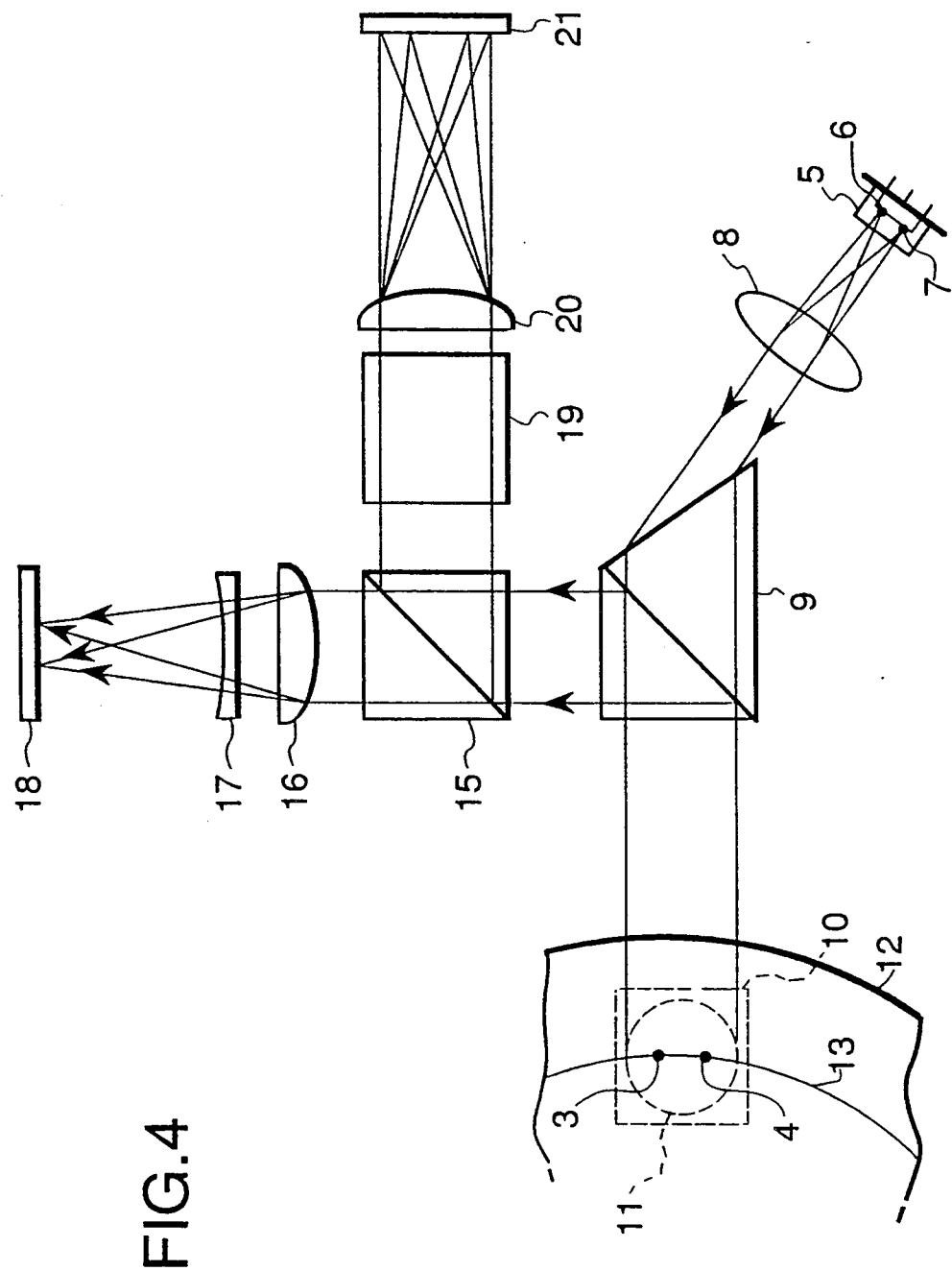
FIG. 4 is a plan view showing the construction of the optical head of the present invention.
Figure 5:
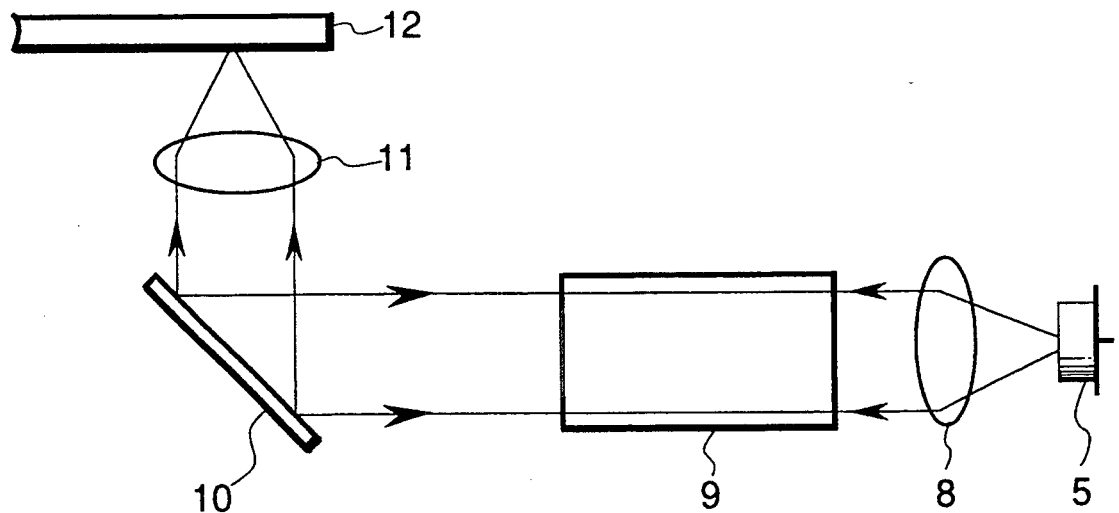
FIG. 5 is a side view of the optical head of FIG. 4.

FIG. 4 is a plan view showing the construction of the optical head of the present invention, and FIG. 5 is a side view thereof. The present embodiment is a two-beam optical head.

A monolithic semiconductor laser array 5 has light emitting points 6 and 7. Both of these light emitting points are 830 nm in wavelength and 30 mW in output, and the spacing d therebetween is 100 μm. Two beams emitted from the light emitting points 6 and 7 are collimated by a collimator lens 8, are transmitted through a beam splitter 9 with a beam shaping portion, are reflected by a mirror 10 and are stopped down as a spot 3 for recording and a spot 4 for reproduction on the track 13 of a magneto-optical disk 12 by an objective lens 11. Recording and reproduction can be accomplished at the same time by these two spots. The reflected beams of the two spots 3 and 4 are again collimated by the objective lens 11, are reflected by the mirror 10, are reflected by the beam splitter 9 with a beam shaping portion, and enter a beam splitter 15. The beams transmitted through the beam splitter 15 are directed to a servo error detection system comprising a convex lens 16, a cylindrical lens 17 and a servo sensor 18. The beams reflected by the beam splitter 15 are directed to a signal detection system comprising a double-refractive crystal 19, a convex lens 20 and an RF sensor 21.

Figure 6:
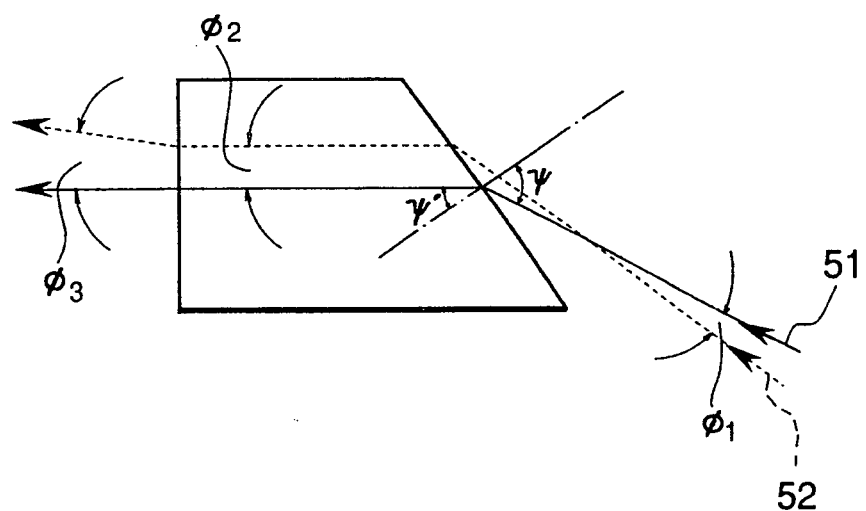
FIG. 6 illustrate beams transmitted through a beam shaping prism.

Now, the angle $\phi$ formed between the two beams collimated by the collimator lens 8 is expressed as $$\phi \simeq d/f_{col}, \quad (1)$$

where $f_{col}$ is the focal length of the collimator lens. After the beams are transmitted through the beam splitter 9 with a beam shaping portion, this becomes $\phi/m$, where m is the beam shaping ratio. This will now be described with reference to FIG. 6.

It is to be understood that two rays 51 and 52 incident on a shaping prism 22 form an angle $\phi_1$ sufficiently small as compared with the angle of incidence $\psi$ of the ray 51. It is further to be understood that the angle of refraction of the ray 51 is 104'. Also, it is to be understood that the shaping ratio of the shaping prism 22 is m and the refractive index of this prism is n. Thereupon, the following equations are established with regard to the ray 51:

$$\sin \psi = n \cdot \sin \psi'$$

$$m \cdot \cos \psi = \cos \psi'$$

Likewise, the following equation is established with regard to the ray 52:

$$\sin (\psi + \phi_1) = n \cdot \sin (\psi' + \phi_2),$$

where $\phi_2$ is an angle corresponding to the angle $\phi_1$ in the shaping prism 22. The left and right sides of this equation become approximately as follows:

(left side) = $\sin\psi \cdot \cos\phi_1 + \cos\psi \cdot \sin\phi_1$ $\simeq n \cdot \sin\psi' + (1/m)\phi_1 \cdot \cos\psi$ -continued (right side) = $n \cdot \sin\psi' \cdot \cos\phi_2 + n \cdot \cos\psi' \cdot \sin\phi_2$ $\simeq n \cdot \sin\psi' + n\phi_2 \cdot \cos\psi'$ Hence, $$\phi_2 \simeq \phi_1/(mn).$$

Further, when the angle formed between the two rays 51 and 52 after having emerged from the shaping prism 22 is $\phi_3$, $$\sin\phi_3 = n \cdot \sin\phi_2 \simeq n \cdot \sin[\phi_1/(mn)].$$

Accordingly, $\phi_3 \simeq (1/m)\phi_1$ is approximately established.

As described above, the two beams forming an angle $(\phi/m)$ therebetween after having passed through the shaping prism are imaged as two spots having a spot spacing L therebetween. When here, the focal length of the objective lens is $f_0$, L is expressed as $$L \simeq f_0 \cdot (\phi/m) \quad (2)$$

From expressions (1) and (2) above, the following expression is derived:

$$L \simeq (d \cdot f_0)/(f_{col} \cdot m)$$

In the present embodiment, $d = 100$ μm, $f_{col} = 8$ mm, $m = 2.4$, $f_0 = 3.8$ mm and the spot spacing L is about 20 μm.

Also, in the servo error detection system, the combined focal length is about 45 mm and the diameter of the spots on the servo sensor 18 is set as about 100 μm$\phi$, whereby the spacing between the spots on said servo sensor 18 is of the order of 230 μm from $45 \times (\phi/m)$ and therefore, the spots are completely spatially separated on the servo sensor 18.

In the above-described embodiment, the beam shaping ratio m of the beam splitter 9 with a beam shaping portion is 2.4, but the value of said beam shaping ratio may be otherwise, e.g. may be set within the range of 1.4–3.5. Examples of the combination of the focal length $f_{col}$ of the collimator lens, the focal length $f_0$ of the objective lens and the spacing d between the two light emitting points in that case will be shown in Table 1 below with the values of $(d \cdot f_0)/(f_{col} \cdot m)$.

TABLE 1

| d [μm] | $f_0$ [mm] | $f_{col}$ [mm] | m | $(d \cdot f_0)/(f_{col} \cdot m)$ [μm] |
|---|---|---|---|---|
| 100 | 3.0 | 9.5 | 1.6 | 19.7 |
| 100 | 3.0 | 8.0 | 2.0 | 18.9 |
| 100 | 3.8 | 8.0 | 2.8 | 17.0 |
| 100 | 3.8 | 7.0 | 3.2 | 17.4 |
| 80 | 3.0 | 8.0 | 2.0 | 15.1 |
| 80 | 3.8 | 7.0 | 3.2 | 13.9 |

While the above-described embodiment has been shown with respect to a case where the optical information recording medium is in the form of a disk, the present invention is equally effective when use is made of any other recording medium than the disk-like medium.

As described above, according to the present invention, there can be realized an optical head which can form on an optical information recording medium a plurality of spots having a narrow spot spacing therebetween by the use of a monolithic semiconductor laser array in which the relative position of a plurality of light emitting points is stable, and in which track deviation occurs from the eccentricity or the like of a disk.

What is claimed is:
1. A plural-beam optical head comprising:
    a monolithic semiconductor laser array having a plurality of light emitting points arranged in a predetermined direction
    a collimator lens for making parallel a plurality of laser beams emitted from said plurality of light emitting points, each laser beam having a diameter;
    an objective lens for imaging said plurality of parallel laser beams on an optical information recording medium; and
    means, disposed between said collimator lens and said objective lens, for expanding the diameter of each of said plurality of parallel laser beams in the predetermined direction of said plurality of light emitting points;
    wherein the following condition is satisfied:

$$(d \cdot f_0)/(f_{col} \cdot m) < 20 \text{ μm},$$

where d is the maximum spacing between adjacent ones of said plurality of light emitting points, $f_{col}$ is the focal length of said collimator lens, $f_0$ is the focal length of said objective lens, and m is the expansion magnification of said means for expanding the diameters of said laser beams.

2. A plural-beam optical head according to claim 1, wherein the optical information recording medium is a disk-shaped recording medium.

3. A plural-beam optical head according to claim 1, wherein the expansion magnification (m) of said means for expanding the diameters of said laser beams falls within the range of 1.4 to 3.5.

4. A plural-beam optical head comprising:
    light source means having a plurality of light emitting points arranged in a predetermined direction;
    a collimator lens for making parallel a plurality of light beams emitted from said plurality of light emitting points, each light beam having a diameter;
    an objective lens for imaging said plurality of parallel light beams on an optical information recording medium; and
    means, disposed between said collimator lens and said objective lens, for expanding the diameter of each of said plurality of parallel light beams in the predetermined direction of said plurality of light emitting points;
    wherein the following condition is satisfied:

$$(d \cdot f_0)/(f_{col} \cdot m) < 20 \text{ μm},$$

where d is the maximum spacing between adjacent ones of said plurality of light emitting points, $f_{col}$ is the focal length of said collimator lens, $f_o$ is the focal length of said objective lens, and m is the expansion magnification of said means for expanding the diameters of said laser beams.

5. A plural-beam optical head according to claim 4, wherein the optical information recording medium is a disk-shaped recording medium.

6. A plural-beam optical head according to claim 4, wherein the expansion magnification (m) of said means for expanding the diameters of said light beams falls within the range of 1.4 to 3.5.

* * * * *

UNITED STATES PATENT AND TRADEMARK OFFICE
CERTIFICATE OF CORRECTION

PATENT NO. : 5,353,274
DATED : October 4, 1994
INVENTOR(S) : Koichiro NISHIKAWA

It is certified that error appears in the above-indentified patent and that said Letters Patent is hereby corrected as shown below:

ON THE COVER PAGE:

UNDER "FOREIGN PATENT DOCUMENTS":

"01251330 10/1989 Japan" should read --1-251330 10/1989 Japan--.

COLUMN 2:

Line 47, "100 82m." should read --100 $\mu$m.--.

COLUMN 3:

Line 67, "illustrate" should read --illustrates--.

COLUMN 4:

Line 46, "104'." should read --$\Psi'$.--.

UNITED STATES PATENT AND TRADEMARK OFFICE
CERTIFICATE OF CORRECTION

PATENT NO. : 5,353,274
DATED : October 4, 1994
INVENTOR(S) : Koichiro NISHIKAWA

It is certified that error appears in the above-indentified patent and that said Letters Patent is hereby corrected as shown below:

<u>COLUMN 6</u>:

Line 9, "direction" should read --direction;--.

Signed and Sealed this

Second Day of May, 1995

Attest:

BRUCE LEHMAN

*Attesting Officer*  *Commissioner of Patents and Trademarks*